Oct. 10, 1939.  L. A. YOUNG  2,175,423
WASHER
Filed Oct. 25, 1937

INVENTOR.
Leonard A. Young
BY Earl & Chappell
ATTORNEYS

Patented Oct. 10, 1939

2,175,423

UNITED STATES PATENT OFFICE 2,175,423

WASHER

Leonard A. Young, Detroit, Mich.

Application October 25, 1937, Serial No. 170,809

5 Claims. (Cl. 85—50)

This invention relates to improvements in washers.

The main objects of this invention are:

First, to provide a wire washer having a relatively small amount of material therein and consequently one light in weight.

Second, to provide a washer formed by bending and compressing operations wherein the wastage of material normally incident to stamping washers from sheet material is completely eliminated.

Third, to provide a washer formed by a bending operation, which is light in weight and can be easily and quickly formed with complete elimination of waste.

Fourth, to provide a washer characterized by its economy of manufacture.

Further objects relating to details and economies of the invention will appear from the description to follow. The invention is defined in the claims.

Preferred embodiments of the invention are illustrated in the accompanying drawing, wherein.

The present invention relates to washers and lock washers and the production thereof and the main objects as stated above are to produce such articles in a most economical and practical manner with the weight thereof reduced to a minimum and wastage during manufacture completely eliminated. The inventive washers are formed from a single length of wire stock appropriately bent by suitable mechanisms and thereafter compressed axially to unite the convolutions thereof and render the same uniform in thickness.

Figure 1:
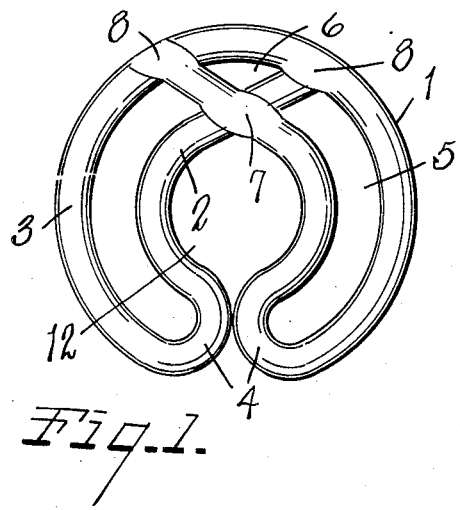
Fig. 1 is a view illustrating a lock washer formed in accordance with my invention.

Referring to Fig. 1, the reference numeral 1 in general indicates a lock washer as contemplated by the invention, consisting of a length of wire of suitable gauge bent tortuously to provide an inner bolt receiving portion 2 integrally connected to an outer peripheral portion 3. The manner of bending the wire is apparent from an inspection of Fig. 1 and it will be observed that the bights 4 are separate and contiguous at the lower side of the washer whereby the same may be manually bent transversely in opposite directions if it is desired to provide a lock washer, or left in the same plane. The portions 2, 3 are separated by segmental weight reducing openings 5 at locations where, in fact, there is no necessity for metal and the same is true of the roughly triangular opening 6 at the side of the washer opposite the bights 4.

After being molded as described, the washer is subjected to a hammering or swaging operation in a direction axial thereof whereby to flatten the sides thereof into a single plane and render the washer uniform in thickness. This swaging step causes the points of intersection of the wire, i. e., points 7 and 8, to be distorted and flattened and likewise serves to cold weld or secure the metal at those points whereby a rigid and permanent washer results.

Figure 2:
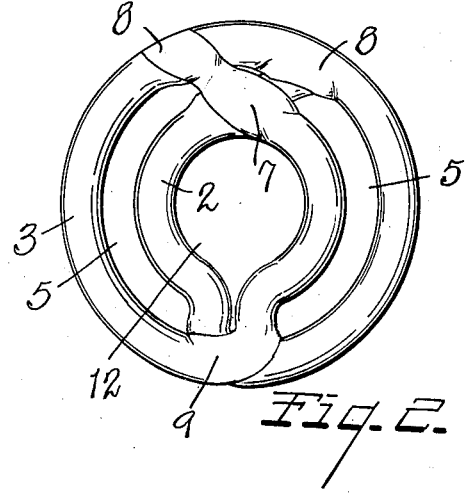
Fig. 2 is a view similar to Fig. 1, illustrating a washer formed in a slightly different manner.

In Fig. 2, I have illustrated a modified form of washer wherein, instead of being bent to provide the opposed bights 4, the wire is crossed at a corresponding point indicated by the reference numeral 9 and thereafter compressed as described with reference to Fig. 1 to produce the form shown in Fig. 2.

Figure 3:
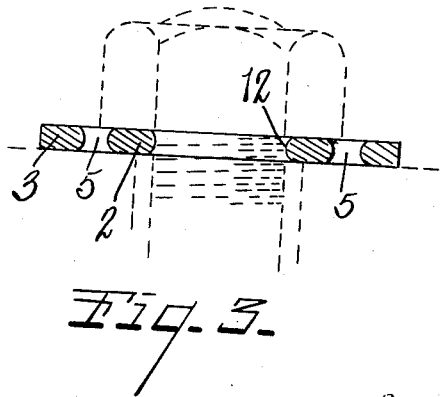
Fig. 3 is a view in transverse section of a washer in accordance with my invention, illustrated in operative relation to a bolt which is shown in dotted lines.

After being compressed, the washer is flat on both sides as illustrated in Fig. 3, wherein the washer is shown in operative relation to a bolt.

Figure 5:
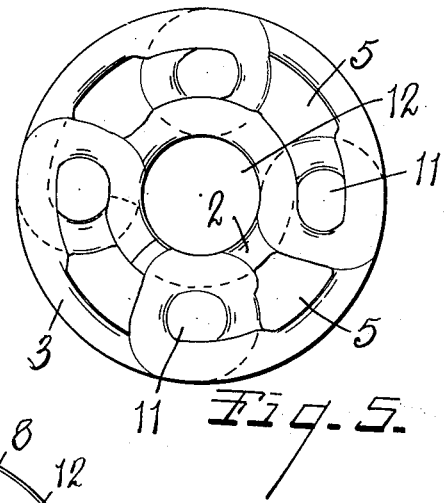
Figs. 4 and 5 are views similar to Figs. 1 and 2, illustrating further modified forms of washers in accordance with the invention.
Figure 4:
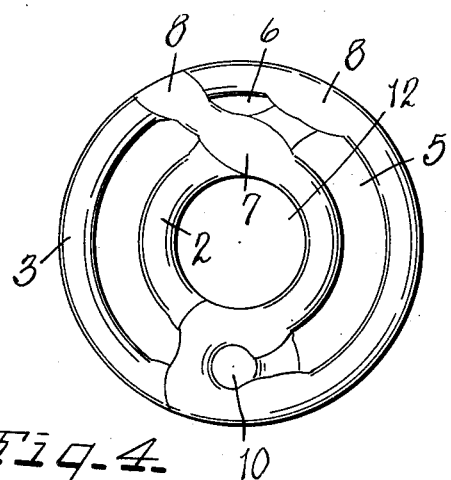

In Figs. 4 and 5, I illustrate still further modified forms of the invention, that illustrated in Fig. 4 being developed from the form shown in Fig. 2 by bending the wire at the lower part of the washer in the form of a circle to form a space 10 corresponding to the space 6, thus distributing the metal uniformly.

In Fig. 5, the wire is bent tortuously to provide the uniformly distributed holes 11 at 90-degree intervals and the intervening segmental openings 5. It will be understood that the articles of Figs. 4 and 5 are compressed finally as described with relation to the other figures in order to distort and weld the metal at the various points of intersection thereof and to flatten the washer.

To summarize—each of the forms is characterized essentially by its formation from a single length of wire stock bent tortuously to provide a central opening or bolt receiving hole 12 which is defined by a portion 2 of the wire, a peripheral portion 3, and a number of weight reducing openings, segmental or otherwise, between the central and peripheral portions, the portions of the wire outlining said intermediate holes being of course integral with and formed by the bending of the wire stock. They serve to stiffen and decrease the weight of the finished product and accordingly render the same more economical of production.

A further feature possessed in common by the illustrated embodiments of the invention is the fact that each is compressed or swaged axially thereof to firmly unite or weld the various points of intersection of the wire, as well as to render the faces thereof uniformly flat and reduce the finished washer to desired thickness. Obviously also, each of the forms is characterized by the saving in material which it makes possible by eliminating wastage normally incident to stamping washers from sheet material.

The final compressing operation may be performed between plain hammering or forcing surfaces, but is preferably carried out in conjunction with means of any suitable type, as for instance a central mandrel (not shown), to assure that the diameter of the bolt receiving hole 12 will not be less than desired and that it will be properly shaped.

Needless to say, washers in accordance with my invention may be formed of any gauge stock which it is practical to bend into the forms described.

I have illustrated and described my improvements in embodiments which are very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent, is:

1. A washer comprising a single length of wire stock bent tortuously to form an inner portion defining a bolt receiving opening and an outer peripheral portion spaced substantially from the inner portion, said portions being united and reinforced by further portions of the stock integral therewith, said wire overlapping at a plurality of points and the washer being compressed axially whereby to distort and unite the metal at said points.

2. A washer comprising a single length of wire stock bent tortuously to form an inner portion defining a bolt receiving opening and an outer peripheral portion connected thereto and spaced substantially from the inner portion, said wire intersecting at a plurality of points and being compressed at the points of intersection whereby to distort and unite the metal at said points and thereby rigidify the washer.

3. A lock washer comprising a single length of wire bent tortuously to provide an inner portion outlining a substantially circular bolt receiving opening and an outer peripheral portion, said portions being joined respectively by bights contiguous to one another and capable of being distorted transversely with reference to one another, said wire intersecting at a plurality of points and the washer being compressed axially to distort and unite the metal adjacent said points.

4. A washer of the type described comprising a wire element bent to provide spaced portions defining respectively a substantially continuous inner bolt receiving opening and the outer periphery of the washer whereby to reduce the weight of the washer, there being portions integral with said inner and outer portions connecting the same and outlining further weight reducing openings spaced from said bolt receiving opening.

5. A washer of the type described comprising a single wire bent tortuously to provide a portion outlining an inner bolt receiving opening and an outer peripheral portion, there being further portions of the wire connecting said portions and outlining a plurality of weight reducing openings, said wire intersecting at a plurality of points and being compressed axially of the washer to distort and unite the metal adjacent said points.

LEONARD A. YOUNG.